United States Patent

[11] 3,588,825

[72] Inventors Carl G. Shook
Pittsford;
Robert F. Anderson, Rochester; Samuel J. Marcano, Macedon, N.Y.

[21] Appl. No. 764,449
[22] Filed Oct. 2, 1968
[45] Patented June 28, 1971
[73] Assignee General Signal Corporation
Rochester, N.Y.

[54] DIGITAL COMMALESS CODE REMOTE CONTROL SYSTEM

17 Claims, 4 Drawing Figs.

[52] U.S. Cl. .... 340/163, 340/167, 340/169
[51] Int. Cl. .... H04q 9/00, H04q 9/10
[50] Field of Search .... 340/168 (SR), 163

[56] References Cited

UNITED STATES PATENTS

| | | | |
|---|---|---|---|
| 2,934,678 | 4/1960 | Sibley | 340/168SR |
| 3,217,297 | 11/1965 | Delugeau | 340/168SR |
| 3,271,517 | 9/1966 | De Rosa | 340/168SR |
| 2,781,447 | 2/1957 | Lester | 340/168SR |
| 3,300,775 | 1/1967 | Dowling | 340/168SR |
| 3,444,520 | 5/1969 | Messiersmith | 340/163 |
| 3,444,521 | 5/1969 | Breese | 340/163 |
| 3,445,815 | 5/1969 | Saltzberg | 340/163 |

*Primary Examiner*—Harold I. Pitts
*Attorney*—Harold S. Wynn

ABSTRACT: A system in which phase unique binary coded commands are transmitted to a remote receiver for the control of equipment. The bits of each command are repetitively sequentially transmitted and when received serially entered into a shift register. Upon entry of each bit, the information then stored in the register is cycled through the register prior to entry of the next succeeding bit and gates recognize whenever the proper coded command appears in the stages of the shift register. Storage units responsive to the recognized command then exert control on the equipment in accordance with the desired function.

INVENTORS
C.G. SHOOK, S.J. MACANO
AND R.F. ANDERSON
BY
THEIR ATTORNEY

Patented June 28, 1971 3,588,825

3 Sheets-Sheet 2

INVENTORS
C.G. SHOOK, S.J. MACANO
AND R.F. ANDERSON
BY [signature]
THEIR ATTORNEY

COMMALESS – PHASE UNIQUE CODE DICTIONARY

| CODE NO. | BIT NO. | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 1 | 0 | 0 | 0 | 1 | 0 | 0 | 0 | 0 | 0 | 1 | 0 | 1 | 0 | 1 | 1 | 1 | 1 | 1 | 1 | 1 |
| 2 | 0 | 0 | 0 | 1 | 0 | 1 | 0 | 0 | 0 | 0 | 0 | 1 | 0 | 1 | 1 | 1 | 1 | 1 | 1 | 1 |
| 3 | 0 | 0 | 0 | 0 | 0 | 0 | 1 | 1 | 0 | 1 | 0 | 0 | 0 | 1 | 1 | 1 | 1 | 1 | 1 | 1 |
| 4 | 0 | 0 | 0 | 1 | 1 | 0 | 0 | 0 | 1 | 0 | 0 | 0 | 0 | 1 | 1 | 1 | 1 | 1 | 1 | 1 |
| 5 | 0 | 0 | 0 | 1 | 0 | 1 | 1 | 0 | 0 | 0 | 0 | 0 | 0 | 1 | 1 | 1 | 1 | 1 | 1 | 1 |
| 6 | 0 | 0 | 1 | 0 | 0 | 1 | 0 | 0 | 0 | 1 | 0 | 1 | 0 | 0 | 1 | 1 | 1 | 1 | 1 | 1 |

INVENTORS
C.G. SHOOK, S.J. MACANO
AND R.F. ANDERSON
BY
THEIR ATTORNEY

DIGITAL COMMALESS CODE REMOTE CONTROL SYSTEM

BACKGROUND OF THE INVENTION

The present invention pertains to a digital remote control system and more particularly to a radio remote control system utilizing highly secured coded commands. While this invention is applicable to a wide range of possible uses, it will be described primarily with regard to the radio control of remote mobile equipment.

In the normal operation of heavy equipment and machinery, it is seldom that the operator is capable of being placed in a position most suitable to control the equipment and its intended function. Remote control devices allow operators to safely and accurately both position and control the equipment in a desired manner. In exerting this type of remote control, radio transmission of coded messages has been found generally to be most serviceable and adaptable, although other modes of communication may prove advantageous under given conditions.

Systems now in use for this purpose are either of the tone or digitally coded type. In tone control systems, the desired command comprises a number of distinct tones, the combinations of which delineate the various functional commands to be imposed. While generally satisfactory and reliable, apparatus of this character has demonstrated a number of problems which add difficulty to their use and may be limiting in their application. If a substantial number of commands must be generated, a large number of oscillators or frequency generators must be employed, necessarily adding to the cost and maintenance of the equipment. In addition, in that the receiving equipment must be capable of accurately distinguishing these tones, the required filter equipment must necessarily be sharply tuned and therefore subject to component aging and resultant readjustment.

With the development of digital techniques and particularly low cost reliable components, tone equipment is to a large extent being replaced by digital systems. Digital techniques inherently provide a much wider available range of coded commands while still remaining economical and reliable. In addition, error detection and correction, transmission, receiving and decoding are generally simplified when employing digital devices.

Obviously, since security of a remote control system is perhaps its most critical feature, effort is continually being expended in improving remote control systems in this regard. This requirement is rendered even more critical in environments containing a large amount of remotely controlled equipment, which due to FCC restrictions, must often be operated on a common frequency channel. In such circumstances, the possibility of interference between adjacent transmitter-receiver combinations is heightened and error detection and correction becomes paramount. This problem is to some degree satisfied by the inherent "capture effect" of FM radio systems and by employment of a pseudorandom transmission techniques which essentially prevent simultaneous transmissions.

The present invention lends added security and simplification to digital remote control equipment by utilizing highly secure codes in a unique manner thereby producing a highly reliable and economical system capable of controlling remote equipment in a desired manner.

It is therefore an object of this invention to provide improved digital remote control system.

It is another object of this invention to provide a highly secure, economical and reliable remote control system.

It is another object of this invention to provide digital remote control system utilizing a highly secure command code.

It is another object of this invention to provide an adjustment-free radio remote control system.

Another object of this invention is to provide improved digital radio receiver apparatus.

Yet another object of this invention is to provide a highly secured code recovery apparatus.

SUMMARY OF INVENTION

In accordance with the present invention there is provided a remote control system having means for generating a phase unique binary coded command and a transmitter for repetitively sequentially sending bits comprising the command. Remotely located receiver means recovers the transmitted command bits and each bit is serially entered into a register. Fast shift means controlled by the entry of each bit into the register, cycles the bits through the register. Decoding means responsive to the register recognize whenever a valid command appears in the register and exerts the desired command function on the remote equipment.

In accordance with yet another feature of this invention, receiver means recovers transmitted bits and each bit is serially entered into a register. Fast shift means controlled by the entry of each bit into the register cycles the bits through the register and decoding means responsive to recognize whenever a valid command code appears in the register.

In accordance with another feature of the present invention, there is provided apparatus for recovering receiver detected bits. A level detector produces a signal of predetermined character whenever the received bit exceeds a threshold level. The level detector signal is then integrated with respect to time and a second level detector produces a second signal of predetermined character whenever the integrated signal exceeds a second threshold level.

For a better understanding of the present invention, together with other and further objects thereof, reference is taken to the following description in conjunction with the accompanying drawings.

DESCRIPTION OF THE PREFERRED EMBODIMENTS

Figure 1:
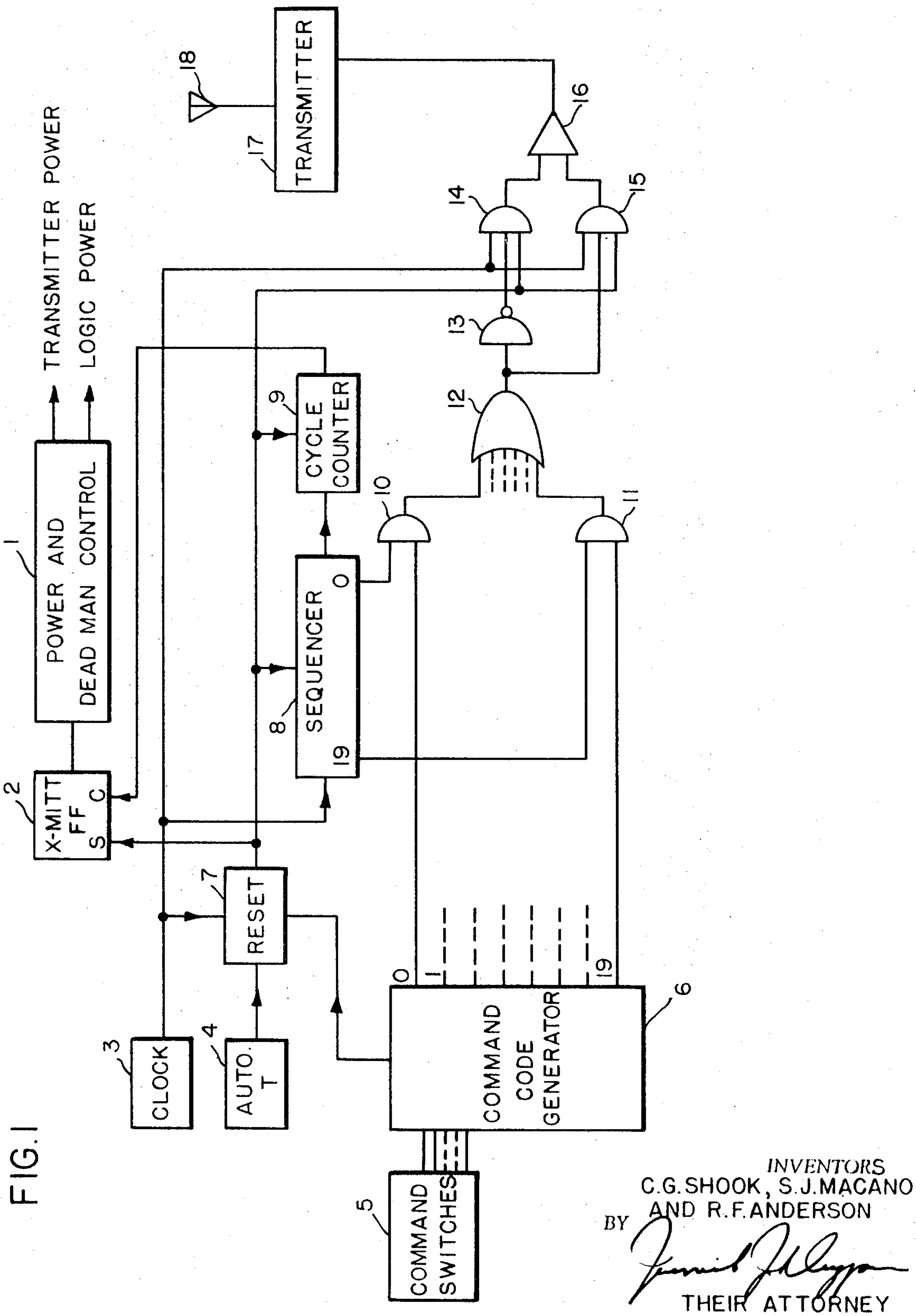
FIG. 1 shows a functional block diagram of the transmission portion of a digital remote control system.
Figure 2:
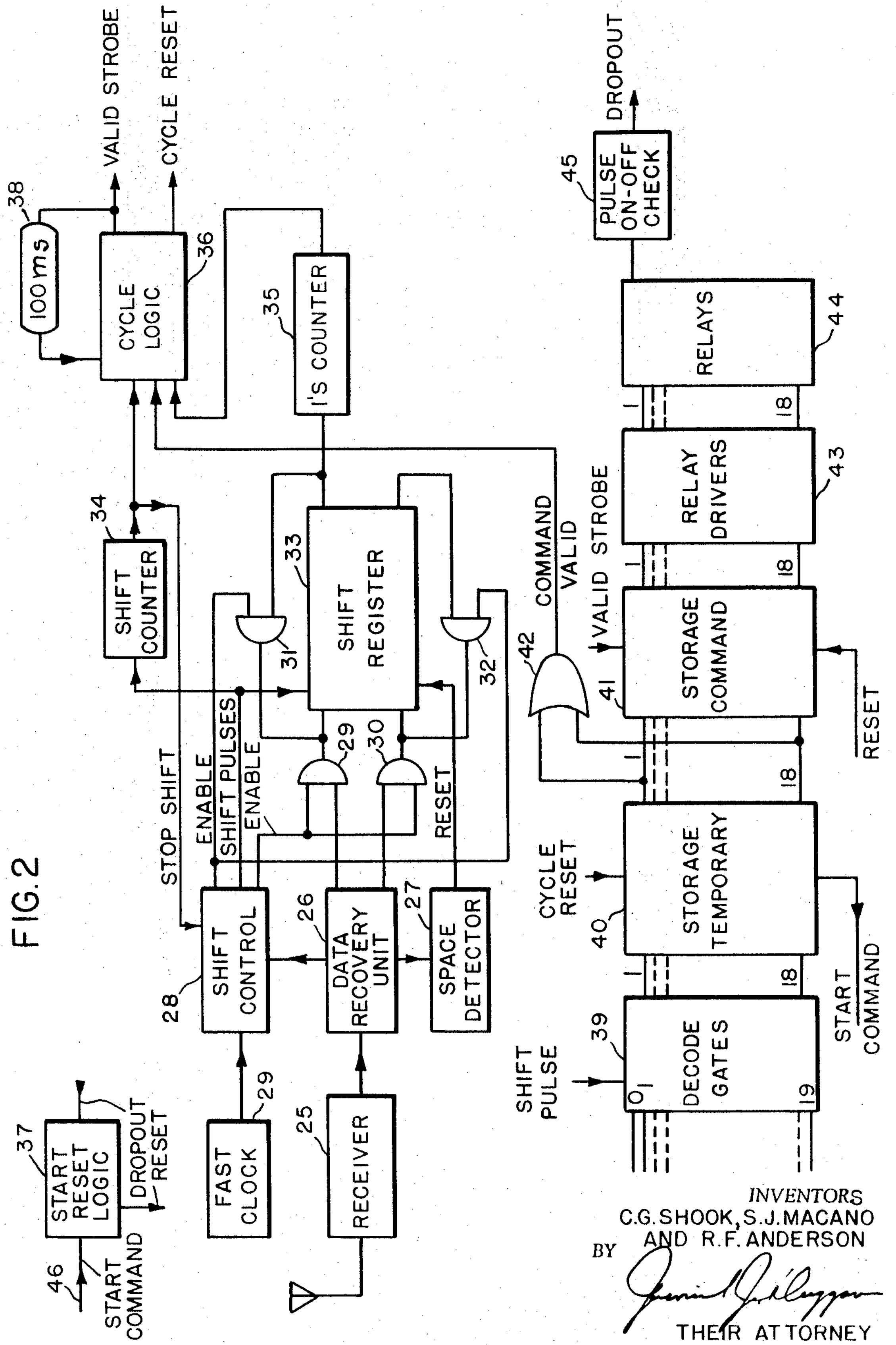
FIG. 2 shows the receiver portion of the remote control system.

Broadly stated, the preferred embodiment of this invention contains a transmission portion as shown in FIG. 1 for radio broadcasting a signal frequency modulated in accordance with the desired command code and a receiving portion as shown in FIG. 2 for detecting the transmitted signal and controlling the remote equipment in accordance with the decoded command.

Referring to FIG. 1, a power and "deadman" control 1 provides the power requirements for the transmitting portion of the equipment, i.e., the transmitter and logic power. This unit is normally carried by the operator and causes a system shutdown whenever it varies from a vertical position by more than a predetermined number of degrees; thus, the provision of the "deadman" control. When in normal transmitting mode, the transmitter power and logic power is turned on or off by the action of the transmit flip-flop 2. This flip-flop 2 is set, thereby turning power on, just prior to the transmission of a command and is cleared, preventing further transmission by turning the power off, upon the completion of a desired number of command transmissions.

A clock 3 comprising any suitable pulse generator provides a basic timing for the transmission of information. Automatic trigger unit 4 generates trigger pulses which initiate transmissions of command codes. The automatic trigger 4 pulses are generated in a varying time pattern between a 0.5 seconds and 1.5 seconds apart, this pseudorandom repetition rate being formed by the outputs of two free-running multivibrators with approximate periods of 1.5 and 2 seconds respectively, each multivibrator output initiating a transmission. A reset unit 7 provides a signal for resetting the transmission portion of the system prior to the sending of coded information.

The command switches 5 are normally manually set to produce a desired command which command is then coded by the command code generator 6. The output of the command code generator 6, comprising 20 bits is scanned by a sequencer unit 8. The sequencer 8 which may comprise a binary counter in combination with a decoding unit is capable of stepping from 0 to 19. The step outputs of the sequencer 8 in conjunction with AND logic circuitry typified by units 10 and 11, to which are also brought the bit outputs of the command code generator 6, sequentially produces pulses indicative of the character of the code bits. OR unit 12 in turn produces a pulse output dependent upon the pulses generated by the AND circuitry. The output of OR unit 12 then divides into two channels, one channel inverted through inverter unit 13. AND circuits 14 and 15 located in each channel produce through amplifier 16 and transmitter 17 a carrier signal modulated to indicate either a ONE or ZERO bit. The AND units 14 and 15 are enabled by the clock pulses thereby causing transmission at a rate commensurate with the frequency of the clock 3.

In the preferred embodiment of the system, frequency modulation is used and the carrier frequency is shifted high or low dependent upon the character of the bit. The cycle counter 9 is responsive to the sequencer 8 and limits the number of times the code information is scanned by generating a clearing pulse upon the occurrence of a predetermined number. The cycle counter output prevents further transmission by clearing the transmit flip-flop 2. Normal operation is recommended upon occurrence of the next trigger pulse.

The command code generator 6 which may comprise diode matrices produces a phase unique code which permits realization of the unique features of the present invention. Within a complete dictionary of words comprised of a particular number of binary digits, there exists a smaller group of words whose patterns have the feature that if any one word of the dictionary is followed by any other word in the dictionary, then any sequential group of the particular number of bits contained within the sequence will not be identical to any other word appearing in the dictionary. Such group of words, since its transmission requires no punctuation for proper recognition, is referred to as a commaless dictionary. This code pattern allows the system to properly operate and recognize codes without the necessity of addressing thereby reducing the cost and complexity of the hardware and increasing system reliability and integrity.

In the preferred embodiment of this invention, since only one command is sent in each transmission, the requirement of having more than one code word followed by another is obviated and it is only necessary that a single word followed by itself not cause confusion. This less restrictive condition allows selection of the code words on a different basis, i.e., that any group of a particular number of coded bits repeated after itself will not be confused with any other word in the dictionary. This group offers the same advantages of equipment simplification while permitting the use of a larger dictionary.

Figures 3, 4:
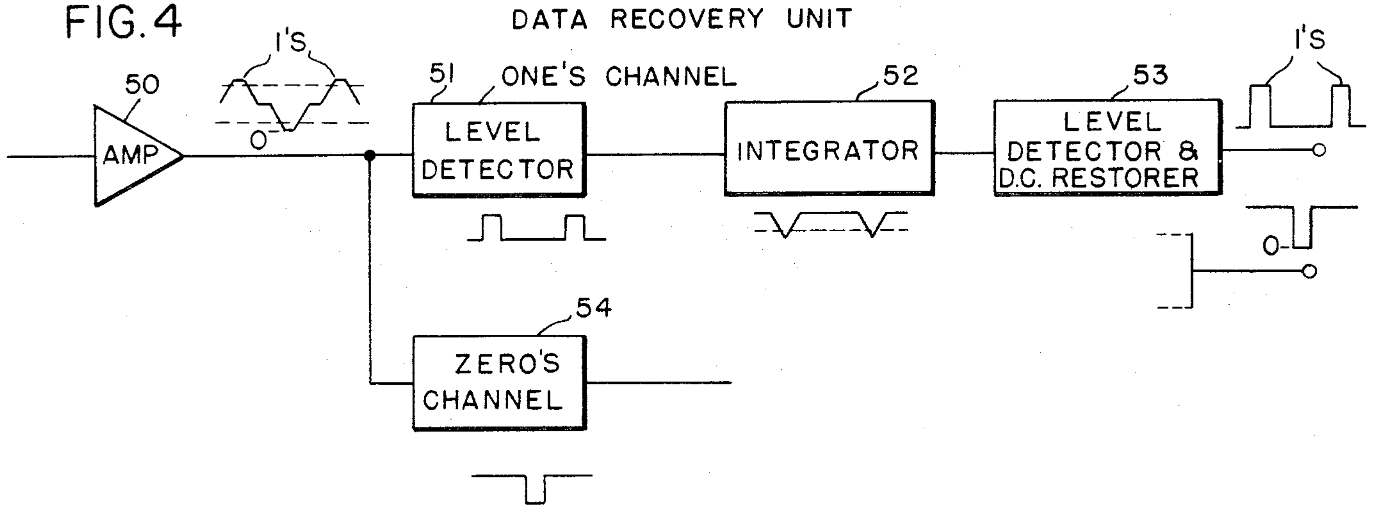
FIG. 3 is a partial chart indicating a limited number of phase unique command codes.
FIG. 4 is a functional block diagram of the data recovery unit of FIG. 2.

Referring to FIG. 3, there is shown a sample of a phase unique code dictionary comprising six words. It is further noted that in order to provide for additional security, a balance ratio code is used i.e., a word containing an equal number of marks and spaces. Additionally, a fixed format was included with each code word. Therefore, the code used in this embodiment comprises a 20-bit phase unique code of 10 marks and 10 spaces, the first 5 bits and the last 2 bits being fixed and common to the entire dictionary. A 20-bit dictionary complying with the aforestated restrictions has been found to contain at least 1152 distinct words. This large group of words is normally sufficient for transmitting necessary information and permits the use of a large number of transmitter-receiver combinations operating on a common frequency channel.

In operation of the apparatus, the operator places the desired command into the transmitting portion of the equipment by manually setting the command switches 5. It has been found that no more than 18 commands, under normal conditions, is necessary to control the remote equipment in a desired manner. Upon setting of the command switch, one of the 18 commands is entered into the command code generator 6. This unit through the structuring of its diode matrix establishes a phase unique code word indicative of the selected command and generates a trigger pulse for placing the transmitter in a condition for sending information. The trigger pulse is sent to the reset unit 7 which generates a signal clearing the sequencer 8, the cycle counter 9 while additionally disabling AND logic circuits 14 and 15. At the same time this reset signal sets the transmit flip-flop 2 thereby actuating the power and deadman control unit 1. The apparatus is held in this condition for a period of 10 milliseconds after which transmission of the code word ensues.

Assuming the selection of the desired command, one input to the AND logic typified by units 10 and 11 is satisfied by the selected command code as a ONE or ZERO while the second inputs to this logic are satisfied by the appearance of signals on the outputs of the sequencer unit 8. As soon as the 10- millisecond period ends, the sequencer unit 8 and the cycle counter 9 and the AND logic circuitry 14 and 15 are enabled. The clock 3 producing pulses at a rate of 1000 Hz. stepping the sequencer unit 8 through its 0 to 19 positions thereby sequentially producing outputs from the AND logic circuitry associated with the bits generated by the code generator 6. At the same time, each pulse of the clock 3 produces an output form either AND circuit 14 or AND circuit 15 depending upon whether a ZERO or ONE bit is being produced by the code AND circuitry, e.g., units 10 and 11.

The output of the code AND logic units 10 and 11 control the output of OR circuit 12 thus producing a pulse output for every ONE and no output for every ZERO present in the code. Inverter unit 13 recognizes the absence of signal and produces a resultant pulse satisfying AND logic unit 14. The output and AND logic 14 therefore represents each ZERO bit, while the output of AND logic unit 15 which is satisfied by the direct output of OR unit 12 indicates a ONE bit.

Amplifier 16 which may comprise any suitable unit capable of producing a positive- or negative-going signal at a controlled rate dependent upon whether an input is received from unit 14 or 15, produces a resultant frequency shift of the transmitter 17 carrier frequency in accordance with the code bits. When power if first applied to the system, the transmitter 17 broadcasts unmodulated carrier frequency and it is not until the reset mode is complete that any bits are transmitted. Since the sending of 20 bits at a rate of 1000 Hz. requires 20 milliseconds, the total time for the transmission of a single command is 30 milliseconds, i.e., the 10- millisecond reset pulse the 20- millisecond period. So as to enable the receiver portion of the equipment to operate in the desired manner, it is necessary that the command be repetitively sent a number of times. Thus, the cycle counter 9 interrogates the sequencer 8 and registers the total number of scans through which the sequencer is shifted by the clock 3 pulse. The cycle counter 9 is programmed to produce an output signal upon the occurrence of four complete scans. Upon the occurrence of this signal, the transmitter flip-flop is cleared and sending stops, thus ONE complete transmission comprises sequential sending of the command data repeated four times in a period of approximately 90 milliseconds.

As long as new commands are not set into the system, the automatic trigger unit 4 continuously generates pseudorandom pulses, which through the action of reset unit 7, places the equipment in condition for resending of the same command word. This broadcasting of the command code continues until a new command is entered into the system by the manual setting of the command switches 5. With this occurrence, the command code generator 6 produces a trigger signal which immediately places the equipment in a condition to send the new command word. Such trigger occurrence immediately ceases any transmission presently going on and allows the system to transmit the new command code.

The receiver portion of the system is shown in FIG. 2. A receiver 25 tuned to the carrier frequency of the transmitter 17 senses and detects the transmitted command code. A data recovery unit 26 reconstructs the bit pulses from the received code and through AND logic circuitry 29 and 30 enters these bits into shift register 33. A fast clock unit 29 and a shift control unit 28 cycle the bits through the register after the entry of each bit. The AND logic units 31 and 32 close the shift register 33 upon itself and permit the end-around cycling of the bits. A shift counter 34 registers the total number of shifts produced by the shift control unit 28 and limits the operation of shift control unit 28 to a predetermined number of shifts. A space detector 27 is responsive to the data recovery unit 26 and immediately clears the shift register 33 if any time the absence of a bit is sensed.

Decode gates 39 are responsive to the information in the shift register 33 and recognize when a valid command code pattern is present in the register. Upon recognition of a code, it is entered into temporary storage 40 and thence into the command storage 41 if the code meets the other validity requirements. The relay drivers 43 and relays 44 are controlled by the command appearing in the command storage 41 and in turn exert control upon the remote equipment. A cycle logic unit 36 responsive to the appearance of a command in temporary storage 40, a predetermined number of ONES in the 1's counter 35 and a predetermined number of shifts in shift counter 34, provides a Valid Strobe Pulse for transferring the information to the command storage 41.

A Pulse ON-OFF Check 45 verifies that a command has not been locked into the system for more than a predetermined time and that a command appears in the storage command unit 41 in less than a second predetermined time. The 100 millisecond time delay unit 38 clears the command storage unit 41 approximately 100 milliseconds after the last valid command recognition. A start reset logic unit 37 shuts down the receiver portion of the system whenever the Pulse ON-OFF Check unit 45 fails to sense a command for a period exceeding the second predetermined time.

During operation, the receiver 25 a normal FM receiver is tuned to the carrier frequency and produces a demodulated signal relative to the transmitted code bits. The data recovery unit 26 essentially filters the receiver signals and reconstructs pulses indicative of either a ONE or ZERO bit. This unit further distinguishes to a high degree between true code signals and those produced by noise either received by the receiver 25 or coupled to the circuitry. In the preferred embodiment of the system, a return to zero code is used, i.e., upon the transmission of each bit the carrier frequency is returned to its unmodulated form prior to transmission of the next bit. This produces a zero level condition between each bit detected by the receiver 25. When using this type of code transmission, there is no need to supply a separate synchronized clock in the receiver in order to distinguish between bits; however, if another type of code were to be used, it may then be necessary to add a synchronized clock in a manner which is well known to those skilled in the art.

With the recovery of each bit by the data recovery unit 26, depending upon its character, it is conducted to AND logic units 29 or 30, the second input to each of these AND circuits is completed by an enable signal derived from the shift control unit 28. The shift control unit 28 produces this enable signal upon the recovery of each bit by the data recovery unit 26. As a bit is brought to either AND units 29 or 30, it is entered into the initial or first stage of shift register 33, with the occurrence of each succeeding bit, the highest order bit is serially shifted through the register. Any bits appearing in the highest order stage of shift register 33 is dropped off with the entry of each new bit. Thus, as previously indicated, since the command codes are repetitively sequentially transmitted, as each new bit of each successive word following the first is entered, the bit then appearing in the highest order stage of shift register 33 is dropped. The space detector 27 assures that the command bits entered into the register 33 are proper by detecting whenever a bit has not occurred in a period commensurate with the 1000 Hz. transmission rate. Timing out of the circuitry results in generating a pulse clearing the entire register 33.

After a bit is transferred from the data recovery unit 26 through either AND logic units 29 or 30 into the shift register 33, the shift control unit 28 goes into its fast shift mode. In this mode the shift control unit 28 driven by the fast clock unit 29 provides shift pulses at a 32 kHz. rate. The shift pulses cause the bits then appearing in the shift register to be shifted through the various stages. AND circuits 31 and 32 are linked to the ONE and ZERO outputs appearing in shift register 33 and are enabled by a signal derived from the shift control 28 during its fast shift mode. The outputs of these AND logic units 31 and 32 are tied to the input lines of the first stage of the register thus forming complete loops on the shift register for both the ONE and ZERO bits. Therefore, the bit appearing in the last stage of the shift register 33 instead of being dropped off is returned and entered into the first stage of shift register 33 thus establishing a cycling of the bits through the shift register 33. This cycling is continued for 20 counts at which time the first bit is returned to its initial position and the fast shift mode ends. A shift counter 34 responsive to the shift pulses produced by the shift control unit 28 produces a signal at the count of 20 which stops shifting of the shift control unit 28 thereby returning the system to its normal data shift mode. Fast shifting is reinstituted in synchronous fashion with the entry of each new bit into the register 33.

Fast shift mode operation gives the receiver portion of the system a high degree of redundancy and recognition accuracy. The decode gates of unit 39 are each tied to their associated shift register 33 stages, as each bit is shifted through the register, the decode gates enabled by the shift pulses are given the opportunity to recognize any valid code pattern which may appear. By way of illustration, if for some reason the third bit of the code is improperly recovered on the first code transmission, a proper code pattern will still be recognized upon the entry into the shift register of the second or any succeeding transmission of the third bit provided there then exists 19 other consecutively proper bits. This recognition occurs as soon as the fast shift mode causes the third bit to appear in the eighteenth stage of the shift register 33. It is further noted that when using the fast shift principle no single transmission need be completely proper in order to obtain a valid code recognition and that multiple bit errors may appear while still permitting reception of valid commands. The unique features of this fast shift mode in conjunction with the phase unique code utilized allow the organization of a relatively simple but highly secure control system.

Added security is lent to the receiving portion of the apparatus by the requirement that a specific number of ONE bits be registered prior to the transfer of the recognized command. A counter 35 responsive to the ONES appearing in shift register 33 continuously counts the ONE bits being shifted through the last stage of the register during the fast shift mode. If a total of 10 ONES is registered at the same time that the shift counter 34 signifies a complete cycle of the bits, i.e., 20 shifts, then a condition is satisfied for the transfer of the command.

When the decode gates of unit 39 recognize a code pattern, it decodes the command and energizes one of the 18 command lines and enters it into a temporary storage unit 40. Decoding is accomplished by diode matrices in a similar but usual manner to the code generation. With the entry of the command in the temporary storage 40, an OR unit 42 having inputs tied to each command storage 40 line generates a signal indicating a valid command. When this latter signal in conjunction with 1's counter 35 indication and a shift counter 34 indication occurs, a Valid Strobe Pulse is generated by the cycle logic unit 36. The Valid Strobe Pulse is conducted to the command storage unit 41 and results in transferring the information from the temporary storage 40 into the command storage 41. At the same time a cycle reset signal is generated by the cycle logic unit 36 which results in clearing all information then appearing in the temporary storage unit 40. The cycle reset signal is generated each time a command appears in the temporary storage 40. With the appearance of a valid command in the command storage unit 41, the relay driver of unit 43 associated with the command, energizes the proper relay in unit 44 which thereafter results in exerting the desired controls.

The Pulse ON-OFF Check Unit 45 scrutinizes the system as to the integrity of the commands controlling the relays of unit 44. This unit senses when a command is placed on the system for greater than a 250- millisecond period. This time span may be varied in accordance with the defined parameters and various exigencies of system operation. NOrmally, 100 milliseconds after the last Valid Strobe Pulse, as determined by time delay unit 38, a check Valid Strobe Pulse is generated which results in transferring the information then stored in the temporary storage 40 into the command storage 41. It will be recalled, the temporary storage 40 is cleared at this time by the cycle reset and the check transfer should result in dropping of the relays in unit 44. If this does not occur in a total of 250 milliseconds, a restrictive command such as emergency stop is applied to the relays of unit 44. This same check unit 45 further senses when no command has been placed on the relays for a period of more than 6 seconds, which may occur upon shutdown on the transmitting portion of the system or through some other failure of the receiving equipment. When this period of 6 seconds is exceeded, a dropout signal is generated by the Pulse ON-OFF Check Unit 45 which initiates the generation of a signal from the start reset logic unit 37 disabling the command storage unit 41 from transferring any commands to the relay drivers 43 and relays 44. Once the system has gone into this mode, it is necessary that a specific predetermined command, e.g., emergency stop, be recognized by the decoding equipment before a signal is sent to the start reset logic unit 37 removing the disabling signal and allowing the system to assume normal operation. Any number of relatively simple timing circuits, well known in the art may be incorporated in the check unit 45.

As previously noted, the data recovery unit 26 essentially reconstructs the bit information from the detected command signals. It performs this task by effectively digitally filtering the received signals and generating positive- and negative-going pulses in accordance with the character of the bit. Referring to FIG. 4, the receiver signal is amplified in unit 50 resulting in a theoretical configuration approaching the waveform shown in FIG. 4. At this point, the signal is conducted to two parallel channels; a ONE channel and a ZERO channel. The first stage of each channel comprises level detectors 51 and 54 respectively which sense any signal exceeding threshold levels as indicated by the dotted lines of the idealized waveform. Inspection of the waveform shown indicates that the output of the amplifier 50 consists of a ONE pulse signal followed by a period of zero and another ONE pulse. Thus, level detector 51 produces two positive-going pulses indicating ONES whenever the waveform exceeds the upper dotted line threshold. Unit 54 produces a signal negative-going pulse representing the ZERO signal when it exceeds the lower dotted line threshold. Both the positive-going and negative-going pulses are in the same relative time sequence as the received signals. The positive-going pulses are then time averaged in Integrator unit 52 resulting in a negative-going ramp function as depicted in the waveform below Integrator unit 52. The amplitude of this ramp function varies in accordance with the time duration of the pulse derived from the level detector 51. A second level detector and DC restorer unit 53 determines whenever the amplitude of the ramp functions exceed a threshold limit, as indicated again by the dotted line intersecting the waveform and a positive-going pulse representing a ONE is produced. The DC restorer portion of the unit returns the signal to a zero or predetermined level.

The same functions take place in the zero channel of the data recovery unit resulting in a negative-going pulse representing a zero bit. Thus, this portion of the system filters out a digital basis all other noise impulses or signals either not having the required amplitude or having a duration characteristic of less than some minimum value. Essentially this renders the receiver insensitive to noise in environments normally encountered.

The foregoing description and analysis has presented a system in which phase unique binary coded commands are transmitted to a receiver located with the remote equipment. The receiver responsive to the transmitter recovers the command bits and enters then into a register. Fast shift means controlled by the receiver means synchronously cycles the stored command bits through the register after each bit is entered into the register and decoding means responsively connected to the register recognizes when the bits represent a valid command code pattern. The recognized command then controls relay closures in order to exert the desired command function through the action of various power drives, well known in the art, on the remote equipment in an appropriate manner.

It is realized that upon reading of this disclosure by one skilled in the art that a number of possible modifications and changes will become apparent. It is therefore intended that those modifications obvious to one skilled in the art be considered to be within the scope of this invention.

We claim:

1. A remote control system comprising:
- means for generating a phase unique binary coded command;
- a transmitter operably controlled by the command generating means for repetitively sequentially sending bits comprising the command;
- receiver means responsive to the transmitter for recovering the command bits;
- a register responsively connected to the receiver means into which the recovered command bits are entered;
- fast shift means controlled by the receiver means to cycle the registered command bits through the register after each command bit is entered; and
- decoding means responsively connected to the register for recognizing when the bits in the register represent the command code pattern, 2. The system of claim 1 wherein the transmitter is a radio device sending a carrier frequency modulated in accordance with the character of the command bits.

3. The system of claim 2 wherein the modulation comprises either a high or a low frequency shift of the carrier on accordance with the character of the command bit.

4. The system of claim 2 comprising a plurality of transmitter-receiver means combinations operating on a common carrier frequency.

5. The system of claim 2 wherein the transmitter normally sends coded commands on a pseudorandom time basis and in which an immediate transmission is triggered upon the selection of each new command.

6. The system of claim 2 wherein the fast shift means is controlled to cycle the command bits through the register after entry of each bit into the register and prior to entry of the next succeeding bit.

7. The system of claim 6 wherein the register is a shift register for serially storing the recovered command bits and circuit means enabled by the fast shift means, connects the highest order stage to the lowest order stage thereby allowing the stored bits to cycle through the register.

8. The system of claim 7 wherein the circuit means comprises first and second AND logic units connecting the ONE and ZERO outputs of the highest order stage to their respective inputs of the lowest order stage.

9. The system of claim 3 wherein the receiver means includes:
- a radio receiver tuned to the transmitter for detecting the command bits; and data recovery means producing bit pulses from each detected command bit, each bit pulse representative of the character of the bit, the data recovery means having:

first level detector means responsive to the detected bit for producing a signal whenever the detected bit amplitude exceeds a predetermined threshold value;

integrator means for averaging the signal output of the first level detector means with respect to time; and a second level detector means responsive to the integrator output for producing a bit pulse whenever the integrator output exceeds a second predetermined threshold value.

10. The system of claim 9 wherein the receiver means further includes space detector means for clearing the register whenever bits are not recovered at greater than a predetermined minimum rate.

11. The system of claim 7 wherein the decoding means includes gates responsively connected to each stage of the shift register for recognizing whenever the bits in the stages represent the command code pattern, the gates being enabled by the fast shift means, and matrix means for producing a signal representative of the command.

12. The system of claim 11 wherein:

a shift counter responsive to the shift register controls the fast shift means to cycle the command bits once prior to the entry of the next succeeding command bit;

a bit counter responsive to the bits in the register indicates the number of ONE's entered;

a temporary storage unit responsive to the decoding matrix into which the recognized command is entered;

command valid means indicates when a valid command is entered into the temporary storage;

cycle logic means responsively satisfied by the shift counter, the bit counter, and the command valid means generates a command strobe pulse; and command storage means is controlled to accept the command in the temporary storage whenever the command strobe pulse is generated.

13. The system of claim 12 in which remote apparatus is controlled in accordance with the command entered into the command storage and check means monitors the propriety of the command imposed upon the remote apparatus.

14. The system of claim 13 wherein the cycle logic means generates a cycle reset signal for clearing the temporary storage whenever the cycle logic means is satisfied and further generates a check strobe pulse a predetermined period after the last valid command thereby imposing a clear command on the command storage.

15. The system of claim 14 wherein the check means includes first timing means for indicating whenever the command imposed upon the remote apparatus is present for longer than the predetermined period, and second timing means for indicating whenever a command is absent for longer than a second predetermined period.

16. The system of claim 15 including start-reset logic means operably controlled by the check means for disabling the command storage whenever a command has not been imposed upon the remote apparatus for longer than the second predetermined period, and start-reset logic means is further controlled to reenable the command storage whenever a predetermined command is recognized.

17. In a remote controlled system, apparatus for receiving transmitted phase unique binary coded commands comprising:

receiver means responsive to the transmitted command for recovering the command bits;

a register responsive to the receiver means into which the recovered command bits are entered;

fast shift means controlled by the receiver means to cycle the register command bits through the register after each command bit is entered; and decoding means responsively connected to the register for recognizing when the bits represent the command code pattern.